(No Model.)
H. R. ARMSTRONG.
KNOCKDOWN POULTRY COOP.
No. 305,368. Patented Sept. 16, 1884.
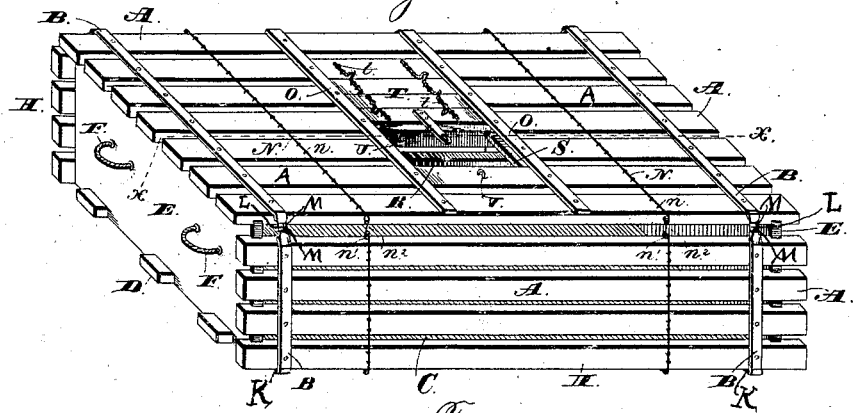

UNITED STATES PATENT OFFICE.

HENRY R. ARMSTRONG, OF SPRINGFIELD, ILLINOIS.

KNOCKDOWN POULTRY-COOP.

SPECIFICATION forming part of Letters Patent No. 305,368, dated September 16, 1884.

Application filed February 16, 1884. (No model.)

*To all whom it may concern:*

Be it known that I, HENRY R. ARMSTRONG, of Springfield, in the county of Sangamon, and in the State of Illinois, have invented certain new and useful Improvements in Knockdown Poultry-Coops; and I do hereby declare that the following is a full, clear, and exact description thereof, reference being had to the accompanying drawings, in which—

Figure 1 shows a perspective view of my knockdown poultry-coop put together ready for use; Fig. 2, a bottom view of the same, unfolded or spread out flat; Fig. 3, a detail view of one of the end boards; Fig. 4, a similar view of one of the slats; Fig. 5, a similar view of one of the connecting-fastenings for the ends of the metal straps; Fig. 6, a sectional view of the top of the coop on line $xx$ of Fig. 1.

The object of my invention is to make an improvement in poultry-coops; and to this end it consists in the construction, arrangement, and combination of parts, as hereinafter described, and more specifically pointed out in the claims.

In the drawings, A A designate the slats of which the greater portion of the coop is composed. These are connected together by straps or bands, B, of metal, preferably iron, which is fastened to each slat by means of clinch-nails, as shown. By this means the slats are held parallel to and at a fixed distance from each other.

The bottom of the coop is, as shown, formed of a board, C, nailed to the upper face of slats D D. These slats are of the same length as slats A A, and at each end project beyond the board C. The ends of the coop E E are made of single pieces of board, and are preferably provided with handles F F. The slats are all grooved transversely near each end on their inner faces, as shown at G G. These grooves are adapted to receive and hold the edges of the end boards, as shown in the drawings, Fig. 1. The strap-connected slats are in three sections or series, as shown best in Fig. 2. Two of the sections or series, H H, contain slats enough to form the sides of the coop, and the third one, I, is long enough to form the entire top of the coop. The side sections are connected with the coop-bottom by links K K, connecting the ends of the metal straps B with the ends of the short straps B' B', attached to the coop-bottom by means of clinch-nails, as shown. These links allow the coop-sections to be folded up and unfolded without danger of breaking the straps, by bending the same at the corners of the coop, as would be the case were the straps continuous. The strap ends at one side of the top section of slats are similarly joined with the upper or outer ends of the straps of one of the side sections. (See Fig. 2.) The other ends of the straps, connecting the top slats and the outer or upper ends of the straps on the other side section, are provided with fastenings to connect and hold them together when the coop is put together ready for use. The form of connection for the top and side straps consists, as shown best in Fig. 5, of two overlapping serrated tongues, L L, one attached to or forming a continuation of each strap end.

When the coop is put together and these tongues are lapped over each other, the rings M M are slid over them, so as to bring and keep their serrated faces together and cause the serrations on one face to engage those on the other. The rings are of such size as to insure that the tongues shall be held closely and firmly together. It will obviously then be impossible for said serrated tongues to be pulled apart, or to be caused to slide one upon the other, until the rings are slid back and off. To further brace and hold in place the slats, I use wires N N, fastened to the slats by means of staples $n\ n$, and at the ends of the sections of slats formed into loops or eyes $n'\ n'$, connected together by wires $n^2\ n^2$, twisted into the eyes. Instead of iron straps and wires I can use chains or tarred ropes. Near the middle of the top section of slats are two parallel straps of iron, O O, fastened, as the other straps, to the slats by clinch-nails. Three or more slats, A' A', in the middle of the top section, are cut away between these straps at P to form a door-opening, R. As shown, the straps O O overlap the inner ends of these cut slats. To the under side of the slats, directly below straps O O, are fastened the cross-strips S S, preferably of wood, and also extending inward beyond the ends of short slats A' A'. Between the straps O O and these strips are guided and slide the ends of the short slats $A^2\ A^2$, forming a sliding door, T. These movable slats are connected together by means of tarred cord fastened to each slat by means of a staple, t. These cords are, as shown, fastened at one end to one of the fixed slats at the end of the door-opening, and the movable slats are attached to the cords at such points along the same as to come into position to form continuations of the fixed slats when the door is pulled shut and the slats are separated to the greatest possible extent. When the slats are pushed back to open the door, the cords loop up, as shown in Fig. 1. The end slat of the door is provided with a slotted tongue or strip, U, to engage the staple V when the door is closed.

Any kind of locking means desired can then be used to prevent the disengagement of tongue and staple.

As is indicated and shown in Fig. 1, the slat-sections, when the coop is put together for use, embrace closely the end boards and hold them firmly in place, because of the edges of the boards entering the grooves in the inner faces of the slats.

Having thus described my invention, what I claim is—

1. In combination with the slats forming the sides of the coop, the straps connecting these slats together, attached to the coop-bottom by means of link-connections, the slats forming the top of the coop connected together by straps attached at one end by means of link-connections to the ends of the straps on one of the sides, and adapted to be fastened at the other end to the straps of the other side section, the end boards entering and held by the grooves in the slats, substantially as shown and described.

2. As means for connecting and holding the slats of a knockdown coop, the straps provided at the bottom and one of the top edges with link-connections, to allow of folding up the coop, and at the other top edge with means for fastening together the ends of the straps holding the side and top slats, and the wires fastened to the slats, provided at the bottom and one of the top edges of the coop with flexible connections and at the other top edge with a fastening device capable of being unhooked or unlocked at will, substantially as shown and described.

3. In combination with the end boards of a knockdown poultry-coop, the slats forming the sides and top of the coop, and supporting its bottom, provided with transverse grooves on their inner surfaces, adapted to receive and hold the edges of the end boards when the coop is put together for use, substantially as shown and described.

4. In combination with the sliding slats forming the door of the coop, the strips overlapping the sides of the door-opening, and acting as guides and supports for the ends of the slats, the flexible cords attached at one end to a fixed portion of the coop, and having the movable slats fastened to them at distances along their length, substantially as and for the purpose described.

5. In combination with a coop-door made of sliding slats connected together by flexible connections, the metal straps, one at each side of the door-opening, supporting the inner ends of the short top slats, and extending beyond them over the door-opening, and the wooden strips, one at each side of the opening, attached to the bottoms of the slats, and loosely holding between it and the metal strap the ends of the sliding door-slats, substantially as shown and described.

6. As a means for fastening together the ends of the slat-connecting straps of a knockdown coop, the overlapping serrated tongues, each attached to or forming part of an end of one of the straps, and rings adapted to be slid over these overlapping tongues to force and hold their serrated faces together, substantially as shown and described.

In testimony that I claim the foregoing I have hereunto set my hand this 7th day of January, A. D. 1884.

HENRY R. ARMSTRONG.

Witnesses:
B. S. GRAVES,
E. R. ARMSTRONG.